Jan. 12, 1943.  M. J. HERZBERGER ET AL  2,308,007

LENS

Filed Oct. 29, 1941

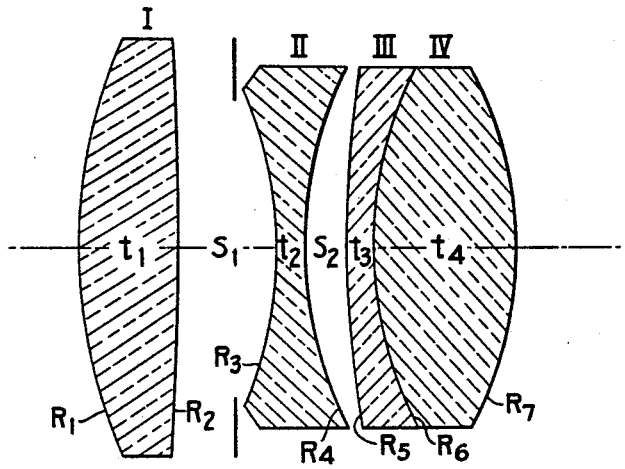

| EXAMPLE 1 | | F = 100 mm. | | f/2.5 |
|---|---|---|---|---|
| LENS | $N_D$ | V | RADII, mm. | THICKNESSES, mm. |
| I | 1.697 | 56.1 | $R_1$ = +63.4 | $t_1$ = 12.4 |
| | | | $R_2$ = −535.0 | $S_1$ = 11.9 |
| II | 1.617 | 36.6 | $R_3$ = −49.0 | $t_2$ = 3.9 |
| | | | $R_4$ = +49.0 | $S_2$ = 4.7 |
| III | 1.649 | 33.8 | $R_5$ = +276.1 | $t_3$ = 3.5 |
| IV | 1.755 | 47.2 | $R_6$ = +49.5 | $t_4$ = 17.1 |
| | | | $R_7$ = −47.1 | BF = 84.9 |

| EXAMPLE 2 | | F = 100 mm. | | f/2.5 |
|---|---|---|---|---|
| LENS | $N_D$ | V | RADII mm. | THICKNESSES, mm. |
| I | 1.697 | 56.1 | $R_1$ = +63.5 | $t_1$ = 12.4 |
| | | | $R_2$ = −535.0 | $S_1$ = 12.0 |
| II | 1.617 | 36.6 | $R_3$ = −49.4 | $t_2$ = 3.7 |
| | | | $R_4$ = +49.0 | $S_2$ = 4.5 |
| III | 1.649 | 33.8 | $R_5$ = +264.4 | $t_3$ = 3.5 |
| IV | 1.755 | 47.2 | $R_6$ = +49.4 | $t_4$ = 17.4 |
| | | | $R_7$ = −47.5 | BF = 84.4 |

MAXIMILIAN J. HERZBERGER
HARVEY O. HOADLEY
INVENTORS

BY *Newton M. Vesrios*

ATTORNEY

Patented Jan. 12, 1943

Search Room 2,308,007

UNITED STATES PATENT OFFICE 2,308,007

LENS

Maximilian J. Herzberger and Harvey O. Hoadley, Rochester, N. Y., assignors to Eastman Kodak Company, Rochester, N. Y., a corporation of New Jersey Application October 29, 1941, Serial No. 416,960

5 Claims. (Cl. 88—57)

This invention relates to lenses and particularly to anastigmatic photographic objectives.

The object of the invention is to provide a four-element, three-component objective with reduced zonal aberrations permitting it to be used at apertures of f/3.0 and larger.

Objectives of the type to which this invention particularly relates consist of three airspaced components of which the front one is a simple positive lens element, the middle one is a simple biconcave lens element, and the rear one is a doublet with its rear surface convex and consisting of a negative element cemented to a positive element of higher index. Objectives of this type are widely used at an aperture of f/4.5 and sometimes at f/3.5 or even f/2.7.

According to the present invention several new features of construction reduce the zonal aberrations and permit the use of greater apertures than theretofore, and when all the features are combined in the preferred form of the invention the zonal aberrations are so greatly reduced as to permit the use of the objective at an aperture of f/2.5 with a flat field out to about 22° from the axis.

The middle component is equiconcave or nearly so; the radius of curvature of its front surface is between 0.8 and 1.5 times that of its rear surface. In most objectives of this type it is necessary to make one concave surface especially strong in order to correct spherical aberration and astigmatism, and the high angles of incidence of the rays on this surface give rise to large zonal abberations, as well as considerable overcorrection of the skew rays. The other features of the invention each contribute toward making it possible to correct the aberration with a more nearly equiconcave middle component, and when all are combined in the preferred form of the invention, the middle component may be made exactly equiconcave.

The other features which contribute toward this end are as follows: The front airspace should be between two and five times as great as the rear airspace. The front surface of the front component should be weaker and the front surface of the second component stronger than heretofore. Preferably the front surface of the front component has a radius of curvature between 0.5 f and f where f is the focal length of the objective, or between one and two times the radius of curvature of the front surface of the second component. A high refractive index and a high dispersive index especially in the front component is advantageous. The refractive index of this component should be between 1.68 and 1.76 and the dispersive index between 43 and 58. It is also advantageous to make the front component biconvex with the radius of curvature of its rear surface between 5 and 20 times that of its front surface, and to make the refractive index difference at the cemented surface in the rear component greater than 0.08 as shown in Patents Nos. 2,158,178 to Frederick and Schade and 2,165,328 to Aklin and Altman.

The accompanying drawing shows an objective according to the invention and constructional data for two embodiments of the invention. This data is also given here:

Example 1   f=100 mm.   f/2.5

| Lens | $N_d$ | V | Radii | Thicknesses |
|---|---|---|---|---|
| I | 1.697 | 56.1 | $R_1=+63.4$ mm. | $t_1=12.4$ mm. |
|   |       |      | $R_2=-535.0$    | $s_1=11.9$. |
| II | 1.617 | 36.6 | $R_3=-49.0$    | $t_2=3.9$. |
|   |       |      | $R_4=+49.0$    | $s_2=4.7$. |
| III | 1.649 | 33.8 | $R_5=+276.1$  | $t_3=3.5$. |
| IV | 1.755 | 47.2 | $R_6=+49.5$    | $t_4=17.1$. |
|   |       |      | $R_7=-47.1$    | B. F.$=84.9$ mm. |

Example 2   f=100 mm.   f/2.5

| Lens | $N_d$ | V | Radii | Thicknesses |
|---|---|---|---|---|
| I | 1.697 | 56.1 | $R_1=+63.5$ mm. | $t_1=12.4$ mm. |
|   |       |      | $R_2=-535.0$    | $s_1=12.0$ |
| II | 1.617 | 36.6 | $R_3=-49.4$    | $t_2=3.7$ |
|   |       |      | $R_4=+49.0$    | $s_2=4.5$ |
| III | 1.649 | 33.8 | $R_5=+264.4$   | $t_3=3.5$ |
| IV | 1.755 | 47.2 | $R_6=+49.4$    | $t_4=17.4$ |
|   |       |      | $R_7=-47.5$    | B. F.$=84.4$ |

It will be noted that these examples embody all the features of the invention. The front space is 2.5 times and 2.7 times the rear space respectively in the two examples. The front surface of the middle component has a radius of curvature respectively 1.00 times and 1.01 times that of the rear surface of the same component. The front surface of the front component has a radius of curvature respectively 1.30 and 1.29 times that of the front surface of the middle component. The other features according to the invention are apparent from the above tables.

Having now explained and illustrated our invention, we wish to point out that it is not limited to the specific examples shown.

What we claim is:

1. A photographic objective of the type consisting of three airspaced components of which the front one is a simple positive lens element, the middle one is a simple biconcave lens element, and the rear one is a doublet with its rear surface convex and consisting of a negative element cemented to a positive element of higher index, characterized by the airspace between the front and the middle component being greater than twice and less than five times the airspace between the middle and the rear component, by the radius of curvature of the front surface of the middle component being between 0.8 and 1.5 times that of its rear surface, and by the radius of curvature of the front surface of the front component being longer but not more than twice as long as that of the front surface of the second component.

2. An objective according to claim 1 in which the front component has a refractive index between 1.68 and 1.76 and a dispersive index between 43 and 58.

3. An objective according to claim 1 in which the front component is biconvex, and the radius of curvature of its rear surface is between five and twenty times that of its front surface.

4. A photographic objective of the type consisting of three airspaced components of which the front one is a simple positive lens element, the middle one is a simple biconcave lens element, and the rear one is a doublet with its rear surface convex and consisting of a negative element cemented to a positive element of higher index, characterized by the airspace between the front and the middle component being greater than twice and less than five times that between the middle and the rear component, by the front surface of the middle component having a radius of curvature between 0.8 and 1.5 times that of the rear surface of said component, and by the radius of curvature of the front surface of the front component being between $0.5f$ and $f$ where $f$ is the focal length of the objective.

5. An objective according to claim 4 in which the front component has a refractive index between 1.68 and 1.76 and a dispersive index between 43 and 58.

MAXIMILIAN J. HERZBERGER.
HARVEY O. HOADLEY.